(12) United States Patent
Rau et al.

(10) Patent No.: US 11,258,883 B2
(45) Date of Patent: Feb. 22, 2022

(54) GENERIC COMMUNICATION LAYER

(71) Applicant: SAP SE, Walldorf (DE)

(72) Inventors: Stefan Rau, Dielheim (DE); Daniel Bos, Beijing (CN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/843,391

(22) Filed: Apr. 8, 2020

(65) Prior Publication Data
US 2021/0320989 A1    Oct. 14, 2021

(51) Int. Cl.
| | |
|---|---|
| *H04L 12/66* | (2006.01) |
| *H04L 67/01* | (2022.01) |
| *H04L 69/329* | (2022.01) |
| *H04L 67/133* | (2022.01) |
| *H04L 67/02* | (2022.01) |
| *H04W 4/02* | (2018.01) |

(52) U.S. Cl.
CPC .............. *H04L 67/42* (2013.01); *H04L 67/02* (2013.01); *H04L 67/40* (2013.01); *H04L 69/329* (2013.01)

(58) Field of Classification Search
USPC ................ 709/203, 227, 232, 236, 223, 224
See application file for complete search history.

(56) References Cited

U.S. PATENT DOCUMENTS

| | | | | |
|---|---|---|---|---|
| 8,175,256 B2* | 5/2012 | Li | ........................ | H04M 3/5166 379/265.1 |
| 8,351,461 B2* | 1/2013 | Duffy | ...................... | H04L 12/66 370/467 |
| 9,300,523 B2* | 3/2016 | Alon | ...................... | H04L 41/044 |
| 10,735,375 B2* | 8/2020 | Slobodskyy | ............ | H04L 67/10 |
| 2004/0003083 A1* | 1/2004 | Wookey | ................... | H04L 67/42 709/225 |
| 2005/0097178 A1* | 5/2005 | Bala | ........................ | H04L 69/08 709/207 |
| 2005/0245272 A1* | 11/2005 | Spaur | ...................... | H04L 12/66 455/456.3 |
| 2007/0022194 A1* | 1/2007 | Brown | .................... | H04L 67/12 709/224 |

(Continued)

*Primary Examiner* — Jude Jean Gilles
(74) *Attorney, Agent, or Firm* — Buckley, Maschoff & Talwalkar LLC

(57) ABSTRACT

Provided is a framework including a generic communication layer that facilitates a separation between communication connections for different communication technologies and an application interfacing with the communication connections. The framework generally includes a remote interface layer including communication interfaces that generically communicate with a client, an application layer that includes applications represented by a set of services that use the communication interfaces to communicate with a client, and a service layer that includes one or more services. The framework includes mechanisms to map parameters of a specific communication technology to a standardized parameter structure that can be used by different service-based applications. In some aspects, the disclosed framework functions to encapsulate each service of an application in a configuration that is communication protocol specific independent of the implementation of the service, where the configuration specifies how the framework is to map services of the application to a specific communication protocol.

20 Claims, 9 Drawing Sheets

(56) References Cited

U.S. PATENT DOCUMENTS

| | | | |
|---|---|---|---|
| 2007/0058793 A1* | 3/2007 | Li | H04M 3/5166 |
| | | | 379/191 |
| 2007/0214110 A1* | 9/2007 | Guertler | H04L 67/02 |
| 2007/0298768 A1* | 12/2007 | Lee | H04W 4/10 |
| | | | 455/412.1 |
| 2008/0140857 A1* | 6/2008 | Conner | G06Q 50/10 |
| | | | 709/236 |
| 2008/0288960 A1* | 11/2008 | Eberlein | G06F 9/546 |
| | | | 719/314 |
| 2010/0217837 A1* | 8/2010 | Ansari | H04L 12/66 |
| | | | 709/218 |
| 2015/0074259 A1* | 3/2015 | Ansari | H04L 67/02 |
| | | | 709/224 |
| 2017/0325056 A1* | 11/2017 | Mehta | H04M 11/04 |
| 2017/0344703 A1* | 11/2017 | Ansari | H04M 15/41 |
| 2020/0252410 A1* | 8/2020 | Casey | H04L 41/16 |

* cited by examiner

GENERIC COMMUNICATION LAYER

BACKGROUND

There are a number of different communication connection types for communicating and exchanging information between an application and other remote systems. Typically, an application is designed to include the necessary configuration details to communicate with the remote systems using the communication protocol or technology used by the remote systems. As such, application developers may be required to implement an application with the core functionalities to be delivered by the application, as well as specific communication protocol or technology configuration details to ensure that the application can effectively communicate with the remote systems.

The communication configuration(s) of traditional applications may typically be tightly coupled with the core functionalities of the application such that the details of the specific communication protocols that may be invoked by the application at runtime need to be considered at design time and included in the application. Accordingly, what is needed is a mechanism that provides a separation between communication connections of an application for different communication technologies and a core functionality of the application interfacing with the communication connections.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
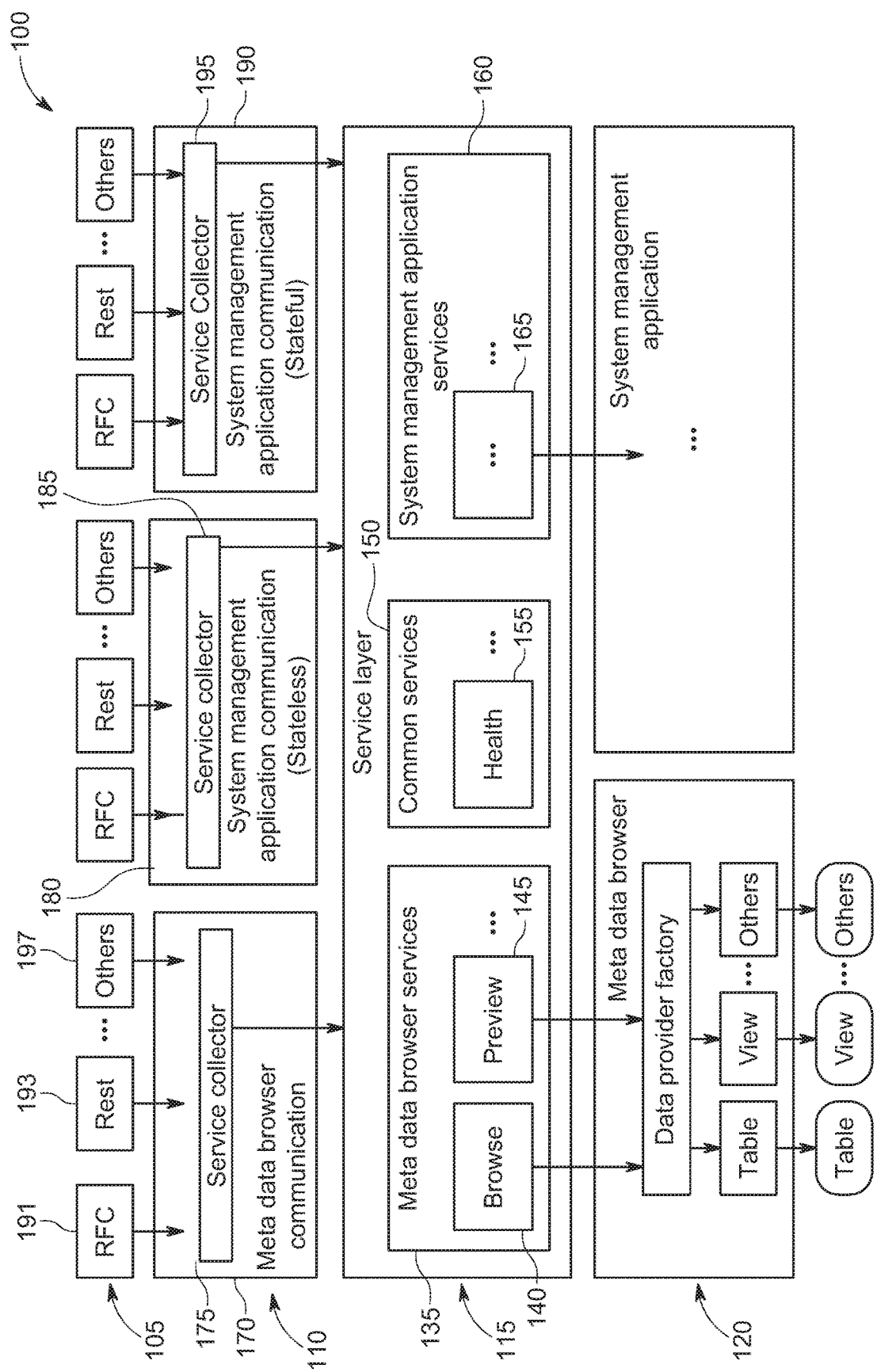
FIG. 1 is an illustrative schematic diagram of a system 100 including an implementation of a communication framework, in accordance with some example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

FIG. 1 is an illustrative schematic diagram of a system 100 including an implementation of a communication framework, in accordance with some embodiments of the present disclosure. System 100 comprises a number of different layers including, for example, a remote interfaces layer 105, an application layer 110, a service layer 115, and data layer 120. For purposes of the present disclosure, the layers including remote interfaces layer 105, application layer 110, and service layer 115 are significantly relevant. Remote interfaces layer 105 includes a number of different interfaces that generically communicate with a client (not shown) using a specific communication protocol or technology. In the example of FIG. 1, the depicted remote interfaces include communication interfaces configured to communicate using REST (Representational State Transfer) protocol (e.g., interface 193), RFC (Remote Function Call) protocol (e.g., interface 191), and other types of communication protocols (e.g., interface 197). Each of the interfaces in remote interfaces layer 105 may be configured to communicate using any of a communication protocol or technology that is now known (e.g., HTTP, Hypertext Transfer Protocol, etc.) or that becomes known in the future.

Application layer 110 includes one or more applications that may be called by a client or otherwise communicate with the client via the communication interfaces in remote interfaces layer 105. Herein, applications in application layer 110 comprise one or more services residing in service layer 115, where each service represents a specific functionality. In the example of FIG. 1, three applications are shown, including a metadata browser 170, a system management application, stateless 180, and a system management application, stateful 190. The applications in FIG. 1 are illustrative examples to demonstrate certain aspects of the present disclosure and are not requirements, per se, of the system 100. Each application (e.g., 170, 180, and 190) incudes a service collector (e.g., 175, 185, and 195, respectively) that collects or otherwise obtains all of the services required for the application containing the service collector. In some aspects, a service may be specific to one particular application. In FIG. 1, a Browse service 140 and a Preview service are specific functions for a metadata browser and are logically grouped together as metadata browser services 135. Likewise, system management application services 160 may include one or more application specific services (i.e., functions). In some aspects, a service may be useable by multiple different applications and are referred to herein as common services. In the example of FIG. 1, common services 150 might include, for example, a Health service 155 that might provide a status or health of an application, system, device, or component when executed. In some aspects, the service collector for each application defines the set of services used in a remote interface. While an application might include one or more services, each application may include one service collector.

In some aspects regarding communication, each service contains all of the information (e.g., parameters, values, etc.) to define the communication aspects for an application. Communication interfaces (e.g., REST, HTTP, etc.) may constitute a small layer containing a collector for each application. As such, an implementation may include a collector for each of system management application, metadata browser, etc., wherein the collector collects, contains, or otherwise obtains all of the services required for its respective application.

Figure 2:
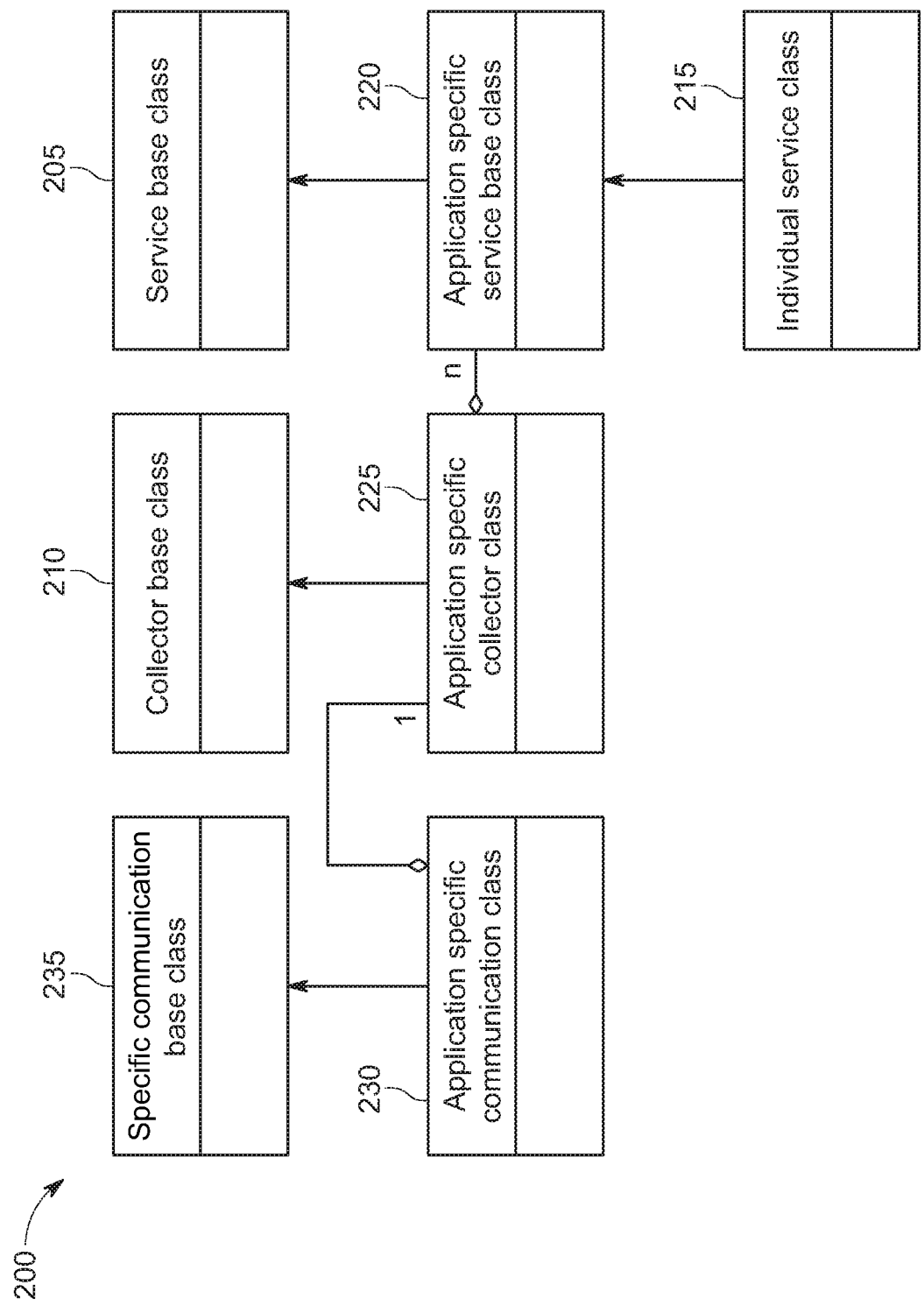
FIG. 2 is an illustrative depiction of an overview of a class diagram 200 illustrating some aspects of a communication layer in accordance with an example embodiment.

FIG. 2 is an illustrative depiction of an overview of a class diagram 200 illustrating some aspects of a communication layer of the present disclosure. In some embodiments, class diagram 200 is an illustrative example of a communication framework. The framework of FIG. 2 has an individual implementation per application. One class is defined per communication technology protocol per application. Framework 200 is generically defined by a service base class 205 and a collector base class 210. Each individual service class 215 contains the complete set of parameters to define the service. In some embodiments, the parameters may be expressed in a neutral format. An application specific service base class 220 may be derived from service base class 205 and further defined by parameters of the individual service class 215. Application specific collector class 225 derives from collector base class 210 and defines specific parameters for the application's collector. The collector for an application is an instance of the application specific collector class 225. There is one application specific collector for each application that is independent of any particular communication protocol. Each individual application specific communication class 230 derives from a specific communication base class 235. In some aspects, the individual application specific communication class interprets a request (e.g., URL, Uniform Resource Locator) containing, for example, parameters required for a service to be processed. The application specific communication class 230 contains a pointer that refers to the collector class 225 containing the one or more application specific services. In some aspects, while there may be more than one communication class for an application (each defined for a specific communication protocol, e.g., HTTP, RFC, etc.) the different communication classes refer to the same collector class 225.

In some embodiments, the configuration of the URL might depend on the communication protocol associated with the URL. For example, for a REST communication protocol a parameter might be defined as a URL path and for a HTTP communication it might be defined by a URL parameter.

Figure 3:
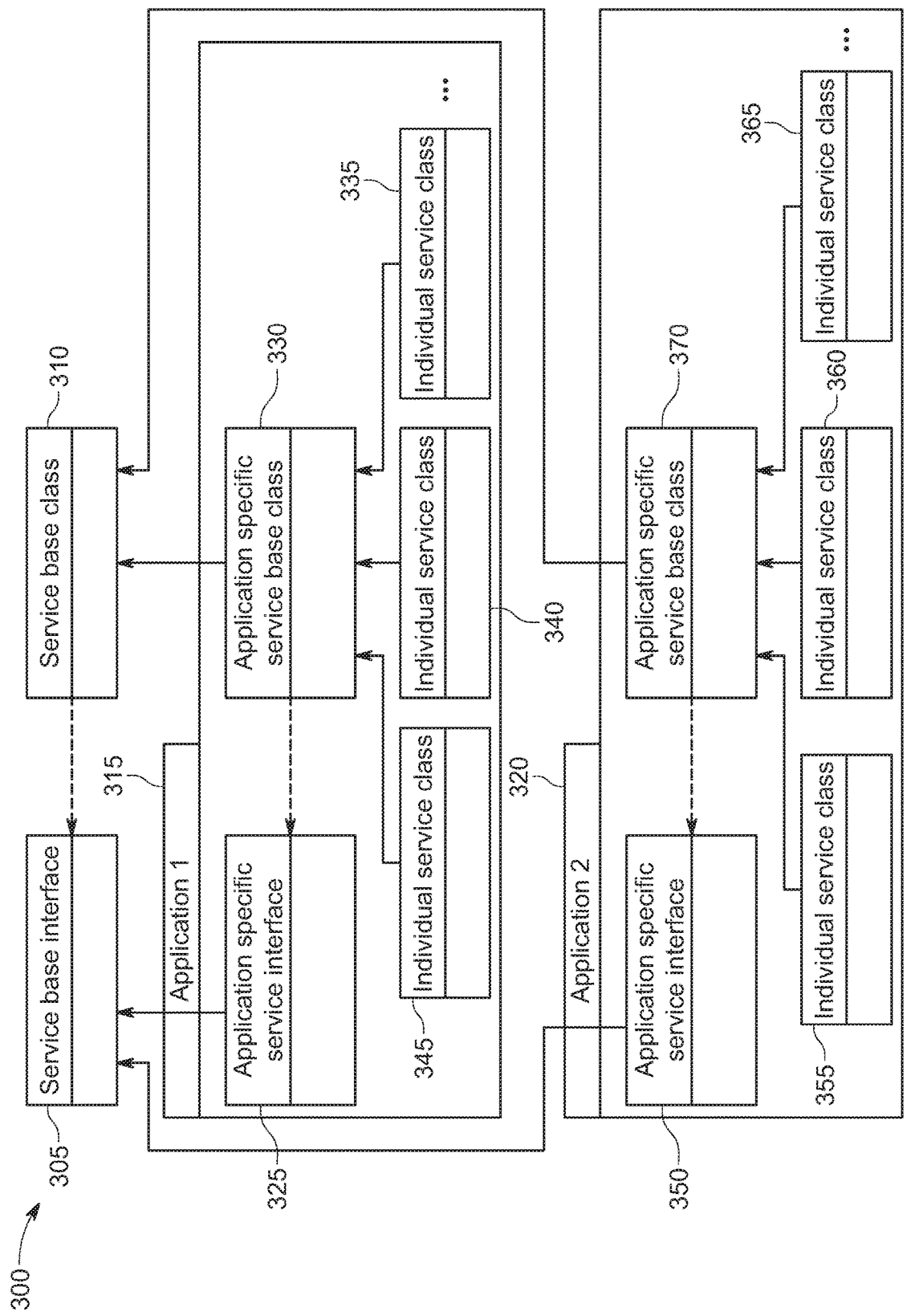
FIG. 3 is an illustrative depiction of a class diagram 300 for a service in accordance with example embodiments.

Further descriptive of a design for an implementation of some aspects of a system herein (e.g., FIG. 1), FIG. 3 is an illustrative depiction of a class diagram 300 for a service, in accordance with some embodiments. Herein, a service class implements a single operation or function and separates communication handling aspects or overhead from strict service handling aspects of a service. That is, service classes encapsulate service calls from application implementation. In some embodiments, an individual service class implementation is required for each service of an application.

The class diagram 300 of FIG. 3 includes a detail representation of some aspects of a first application 315 and a second application 320, where the structure of the classes comprising an application is the same for each application, although the specific services in the particular applications may differ in specific type and/or number. Referring to Application 1 at 315, application specific service base class 330 derives from service base class 310 and is further defined by the one or more individual service classes 335 (e.g., "Health" service), 340 (e.g., "Browse" service), and 345 (e.g., "Preview" service). Application specific service interface 325 derives from service base interface class 305 and contains the parameters for processing the communication aspects of application 1. As shown, service base interface 305 and service base class 310 are used by both Application 1 and Application 2.

The class structure for example Application 2 at 320 is similar to that of Application 1. Accordingly, an understanding of the class structure of Application 2 (and other applications in accordance with the present disclosure) may be had by referring to the discussion of Application 1 above.

Figure 4:
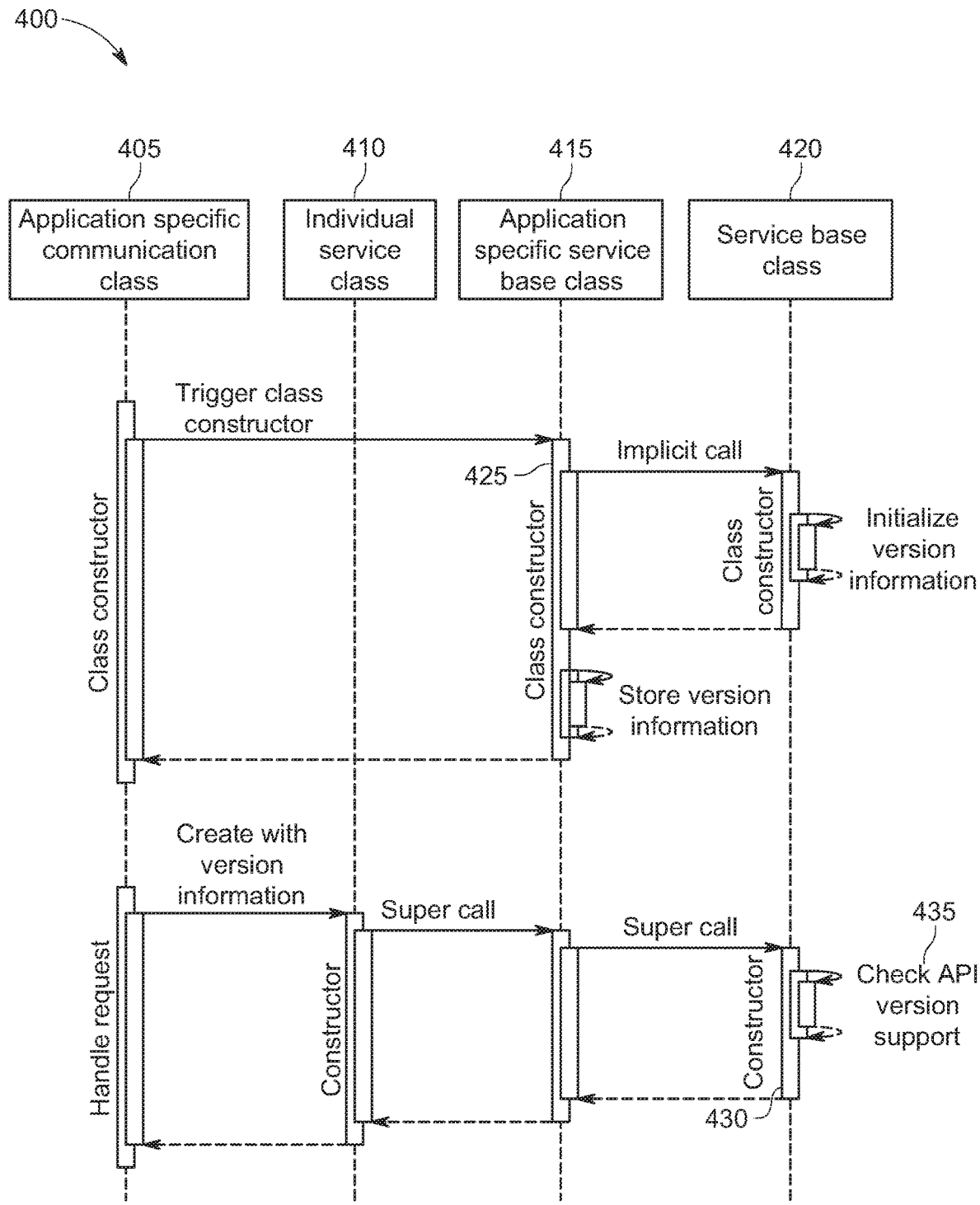
FIG. 4 is an illustrative depiction of a sequence diagram for a Version service in accordance example embodiments.

Regarding an implementation of a service base class and a service base interface class, FIG. 4 is an illustrative depiction of a sequence diagram for a Version service, including an initialization of the service and a use thereof to process a request. Aspects and features for the implementation of the Version servicer of FIG. 4 may be similar to other services. The service base class 420 may implement version management of an application, including, in some embodiments, other basic tasks such as error handling. The application specific service base class contains application specific code that is used by all service classes deriving from the service base class. Some example embodiments include, for example, specific facade handling, common objects for JSON rendering, etc. In some aspects, the individual service classes 410 are part of the specific application's implementation and implement the individual request handlers and the registration logic for the application.

In some embodiments, an application might possibly implement one or more different versions. Different versions of the application might include different feature sets, including for example, different communication technology capabilities. In an initialization phase of an application, a request may trigger a class constructor 425 for an application specific service base class 415 that provides an implicit call to a service base class 420 to initialize/create version information that is stored in a buffer for the application specific service base class. In some embodiments, the buffer stores version information for all supported versions of the application. Version information is specific to each application, so the class constructor of each application specific service class fills the buffer with the version information corresponding to its respective application. The version information can be defined (e.g., programmatically) within an interface. As an example, the service base class may initialize a version object and assign it some basic values indicative of an initial version such as "version1.0" or an empty version information.

Subsequent to the initialization of the version service for an application at 430, when a request handling is triggered by a calling client, request handling processes request the different kinds of communication, including handling communication specific peculiarities for different communication technologies given request and response objects. In some embodiments, a response uses parameters from a request object and stores them back into a response object to encapsulate any kind of communication technology from the parameters. In some aspects, other implementation artifacts may be created and used in the implementation of a Version (and other) service(s).

In some aspects, version information contained in the communication request is processed, wherein version information in the request (if any) may be checked by the service base class at 435 against version information stored in the above-mentioned buffer to determine whether a version specified in the request is supported by the implementation of the application. In some embodiments, the individual constructor may contain additional code that is not strictly related to or relevant for version information.

In some embodiments during a processing session, class constructors are called for the session when a class is touched the first time. A subsequent (e.g., second) session will then start class construction again. Accordingly, depending on what application is used, the buffer storing version information may be filled differently. In some aspects, versioning is application specific. As such, within a session versioning may only initialized once for a given application. In some aspects, all requests in a given session are handled with the versioning specific to that session, even when multiple sessions are concurrently active. Moreover, version information may be handled separately and independently for different applications.

Figure 5:
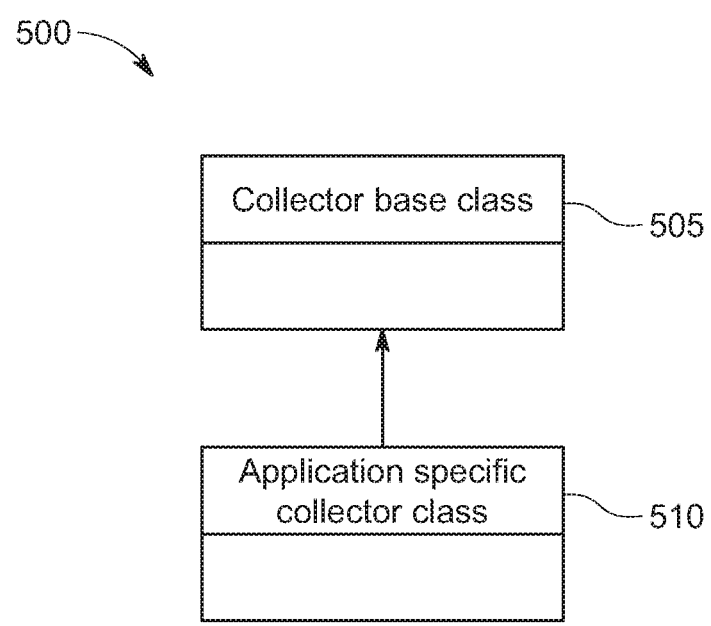
FIG. 5 is an illustrative depiction of a class diagram 500 for a collector in accordance with an example embodiment.

Regarding an implementation of collector classes, a collector collects or otherwise obtains or registers all of the services of an application and handles recognition of specific service classes based on a request (e.g. a URL). FIG. 5 is an illustrative depiction of a class diagram 500 for a collector. As shown, the class diagram includes a collector base class 505 and an application specific collector class 510.

In some aspects, collector base class 505 implements common code for a collector and contains the definition of the parameters that are used by the individual service classes. The interpretation of the parameters for a specific service is accomplished in the application specific communication base classes 510. The base implementation of each communication technology needs to know how to interpret the definition(s) specified by the parameters.

In some embodiments, as an example, for all kinds of HTTP connections parameters may be configured in different ways including, but not limited to, as part of a URL path, as a URL parameter, and as a request header. In another illustrative example, the communication technology may be RFC, where function parameters are used directly. Similarly, connection parameters for other communication technologies may be configured as required by the given communication protocol.

In some instances, some portions of a URL path might serve as a parameter name, whereas other portions might comprise parameter values. In some instances regarding URL parameters, some parameters might be mandatory while others may be optional. Accordingly, a language describing a URL may contain different kinds of parameters. In a similar manner, other sources of parameters might also include mandatory and/or optional parameters.

In some embodiments of URL parsing, the sequence of parameters in a definition is important to the meaning and interpretation of the parameter. In some aspects, each parameter may be addressed by a name, wherein a set of parameters may be combined and referenced by the name of a service and a method describes a complete service.

In some embodiments, a process of how parameters are determined (i.e., interpreted) is technology specific (e.g., REST, HTTP, etc. may each be handled differently) and is mapped to the representation within the collector.

Regarding the definition of collector parameters, some parameters may be mandatory and some parameters may be optionally included. Examples of some mandatory parameters for communication interfaces herein might include a statement, a main statement, a segment, and a path segment.

In some embodiments, a statement is a fixed string, the value of which is used to make a communication call (e.g. a URL path) readable and is not evaluated by the application. It may be located in a well-defined position of the URL (e.g., in the case of REST communication). As an example, a parameter defined with name="dataset" and kind="statement" may be represented for REST communication as: /v1/dataset/path/children, where the sub-path "dataset" is a statement.

In some embodiments, a "main statement" parameter may be similar to a statement but identifies an individual service class that defines the set of parameters that is used to instantiate the corresponding service class. The main statement parameter may define which part of the URL is a parameter and which part is a value. An example includes a parameter defined with name="service" and kind="main statement" for REST communication as: /v1/dataset/path/children, where the sub-path "children" is a main statement. In some embodiments, the main statement must be the last part of a URL path. In the instance of HTTP Communication, the parameter may be represented as: ?service=children&path=/&version=v2.

Regarding a "segment" parameter, the segment is a value that is extracted and transported to the application. Examples include a parameter define with name="version" and kind="segment" and represented for REST Communication as: /v1/dataset/path/children, where the sub-path "v1" is a segment; and represented for HTTP Communication as: ?service=children&path=/&version=v2, where for the HTTP communication it is mapped to a URL parameter.

A "path segment" parameter represents a path that is expressed as sub-path of a complete URL path that is extracted and transported to the application under the conditions of, per set of parameters, only one path segment is allowed, otherwise a path is not unique anymore; and the main statement must be defined as a next sibling to the path segment. An example includes a parameter defined with name="path" and kind="path segment" for REST Communication represented as: /v1/dataset/TABLES/BC/SRV/NWD/children, where the sub-path "TABLES/BC/SRV/NWD" is a path segment; and for HTTP Communication is represented as: ?service=children&path=/TABLES/BC/SRV/NWD&Ssearch=SNWD_AD, where it is mapped to a URL parameter.

In an instance including REST communication together with additional URL parameters, additional parameters may also need to be defined. For example, an additional mandatory parameter for the REST communication is required, similar to "segments". Although, for HTTP communication, it makes no difference to segment definition. As an example for a parameter defined with name="top" and kind="mandatory parameter" for REST Communication, the additional mandatory parameter may be represented as:
/dataset/%2FTABLES%2FBC%2FSRV%2FNWD/children?$top=5

As mentioned above, some parameters might be optional. An example might include a parameter defined with name="skip" and kind="optional parameter" for REST Communication and represented by:
/dataset/%2FTABLES%2FBC%2FSRV%2FNWD/children?$top=5$skip=50

Some parameters might be a "default parameter" that is optional but assigned a well-defined default value if the parameter part of the URL is otherwise not defined. An example for a parameter defined with name="skip" and kind="default parameter" with value="50" for REST Communication may be represented as:

/dataset/%2FTABLES%2FBC%2FSRV%2FNWD/children?$top=5,
where the framework creates a parameter "skip=50" for later processing.

In some embodiments, a header parameter might be (if at all defined) a mandatory, optional, or default parameter that extracts information from HTTP headers. A header parameter might be possible only if the communication type provides communication headers (e.g., HTTP). As an example, RFC-like communication technologies the mandatory and optional parameters may not be considered.

In some embodiments, in addition to the complete definition of a path, a service might use additional input(s) to map all capabilities of a service call. Such additional definitions may include the name of the service and a method, illustrate an implementation using a parameter table. In some other embodiments, a parser can be used to translate a URL-based notation from a domain specific language into the internal representation that is shown. In some other embodiments, parameters might be expressed or defined by additional, alternative, and different mechanisms.

As an example, a "set port" service defines, in detail, a service that sets a port. For example, an HTTP call may set specific parameters using a REST put method. The URL may be represented as/v1/graph/<graph_id>/port/<port_direction>/<port_number> or /graph/<graph_id>/port/<port_direction>/<port_number>. The parameter table representation may include (for a definition with a specified version "v1" and a definition without a specified version):

```
lt_service = VALUE #(
    (
        name = 'set_port'
        method = if_rest_message=>gc_method_put
        parameters = VALUE #(
            ( name = 'version'        kind = cl_dhbas_col_base=>ty_parameter_kind-v_segment
        )
            ( name = 'graph'          kind = cl_dhbas_col_base=>ty_parameter_kind-v_statement )
            ( name = 'graph_id'       kind = cl_dhbas_col_base=>ty_parameter_kind-v_segment )
            ( name = 'port'           kind = cl_dhbas_col_base=>ty_parameter_kind-v_main_statement)
            ( name = 'port_direction' kind = cl_dhbas_col_base=>ty_parameter_kind-v_segment )
            ( name = 'port_number'    kind = cl_dhbas_col_base=>ty_parameter_kind-v_segment)
        )
    )
    (
        name = 'set_port'
        method = if_rest_message=>gc_method_put
        parameters = VALUE #(
            ( name = 'graph'          kind = cl_dhbas_col_base=>ty_parameter_kind-v_statement )
            ( name = 'graph_id'       kind = cl_dhbas_col_base=>ty_parameter_kind-v_segment )
            ( name = 'port'           kind = cl_dhbas_col_base=>ty_parameter_kind-v_main_statement )
            ( name = 'port_direction' kind = cl_dhbas_col_base=>ty_parameter_kind-v_segment )
            ( name = 'port_number'    kind = cl_dhbas_col_base=>ty_parameter_kind-v_segment )
        )
    )
).
``` where the name is used to identify the correct service instance and the method might be used to identify a specific service that can also be forwarded to an identified service. The foregoing examples of the definition of collector parameters is provided as illustrative embodiments related to or in the context HTTP and REST communication technologies, though not limited thereto. The present disclosure is applicable to other communication technologies and protocols, such as, for example RFC. In one RFC embodiment, the parameters might be configured similar to a "normal" call signature: ServiceName(Parameter1:=Value1, Parameter2:=Value2 . . . ), wherein the definition for the parameters might be, as an example, represented by ServiceName(Parameter1 Mandatory, Parameter2 Optional Default:=50 . . . ) that can be mapped by the specific communication base class in one embodiment.

In some aspects, the definition specified to express parameters herein, may be used for the different communication technology implementations. That is, the same definition, located in a service class, may be used by each of the different communication technology implementations.

In some embodiments, parameters might be expressed or defined in a "parameter table". Following are examples that In a (simplified) RFC example without variable declarations wherein the service still contains the interface description or definition, a RFC implementation might check the validity of the parameters and might be represented as:

```
FUNCTION dhape_graph_roundtrip
    IMPORTING
        VALUE(it_port) TYPE dhape_t_graph_port
    EXPORTING
        VALUE(et_port) TYPE dhape_t_graph_port.
" get request / response interfaces
li_request = cl_dhbas_rfc_request=>new( ).
li_response = cl_dhbas_rfc_response=>new( ).
" pack parameters into request
li_request->set_parameter( iv_name = "IN_PORT" iv_value = it_port ).
" handle the service request
CREATE OBJECT lo_service.
    lo_service->handle_request( request = li_request response = li_response ).
" get parameters from response
et_port = li_response->get_parameter( "OUT_PORT" ).
ENDFUNCTION.
```

A "browse" service may define a service that implements a browsing operation. A URL representation might include"/v2/dataset/%2FTABLES%2FBC%2FSRV%2FNWD/children?$top=5 or /dataset/%2FTABLES%2FBC%2FSRV%2FNWD/children?$top=5. The parameter table representation including a specified version may be represented as:

```
lt_service = VALUE #(
  (
    name = 'browse'
    method = if_rest_message=>gc_method_get
    parameters = VALUE #(
      ( name = 'version' kind = cl_dhbas_col_base=>ty_parameter_kind-v_segment )
      ( name = 'dataset' kind = cl_dhbas_col_base=>ty_parameter_kind-v_statement )
      ( name = 'path'    kind = cl_dhbas_col_base=>ty_parameter_kind-v_segment )
      ( name = 'children' kind = cl_dhbas_col_base=>ty_parameter_kind-v_main_statement )
      ( name = 'top'    kind = cl_dhbas_col_base=>ty_parameter_kind-v_parameter_optional )
      ( name = 'skip'
        kind = cl_dhbas_col_base=>ty_parameter_kind-v_parameter_default
        value = "0" )
    )
  )
).
```

In some embodiments, the example parameter tables for the example services above may be implemented in a specific application communication base class.

In some embodiments, the specific application communication base class implements different artifacts. The above-described types of parameters (e.g., Statement, Main Statement, Segment, Path Segment, Mandatory Parameter, Optional Parameter, and Default Parameter) may be defined as a constant or enumerations. The implementation artifacts might include, for example, a parameter table that contains a table of the kinds of parameters and the name of each parameter. Defined is a structure and the corresponding collection (table) definition and a service definition that contains the name of the service, the method and the parameter table. Other artifacts may include a service cache that is a member based on a table that contains name, version and reference to a service instance. A further artifact might be a register service that is a method that is called by each service class in registration cycle. In some aspects, each service can register itself. In some instances to implement more readable definition languages, it may be possible to implement a logic that creates a parameter table from another (e.g., more readable) representation.

For example, instead of the following parameter table:

```
parameters = VALUE #(
  ( name = 'version'        kind = cl_dhbas_col_base=>ty_parameter_kind-v_segment )
  ( name = 'graph'          kind = cl_dhbas_col_base=>ty_parameter_kind-v_statement )
  ( name = 'graph_id'       kind = cl_dhbas_col_base=>ty_parameter_kind-v_segment )
  ( name = 'port'    kind = cl_dhbas_col_base=>ty_parameter_kind- v_main_statement)
  ( name = 'port_direction' kind = cl_dhbas_col_base=>ty_parameter_kind-v_segment )
  ( name = 'port_number'    kind = cl_dhbas_col_base=>ty_parameter_kind-v_segment )
)
``` a definition may be used, such as for example:
path=7<version>/graph/<graph_id>/port/<port_direction>/<port_number>,
wherein a parser for the used language can be placed in the base class that understands how to parse the definition.

Other implementation artifacts may include a "get services" that retrieves a list of all registered services and may be used for parsing parameters (e.g., in HTTP request handling); and a "get service instance" that retrieves the instance of a defined service and is called after all parameters are recognized (e.g., after a URL is parsed) and returns the service that is addressed by the service call. In some embodiments, the implementation operates on the service cache.

Regarding application specific collection classes introduced above, these classes derive from a collector base class and the implementation is specific for each application. In some aspects, they implement a collection of all of the services registrations required by the implementation. In some embodiments, an implementation of application specific collector classes may only implement a constructor that collects all required registrations.

In some embodiments, the implementation of communication interfaces and classes (e.g., the remote interfaces introduced in FIG. 1) herein may be represented by a service call that is split into a request cycle and a response cycle. As such, two interfaces are implemented for each communication protocol type. For example, an HTTP communication will implement an HTTP request class and an HTTP response class, a RFC communication will implement a RFC request class and a RFC response class, and likewise for other communication protocols. Based on this separation of a service call into a request cycle and a response cycle, each service class may operate its requests and responses independent of kind of communication.

Figure 6:
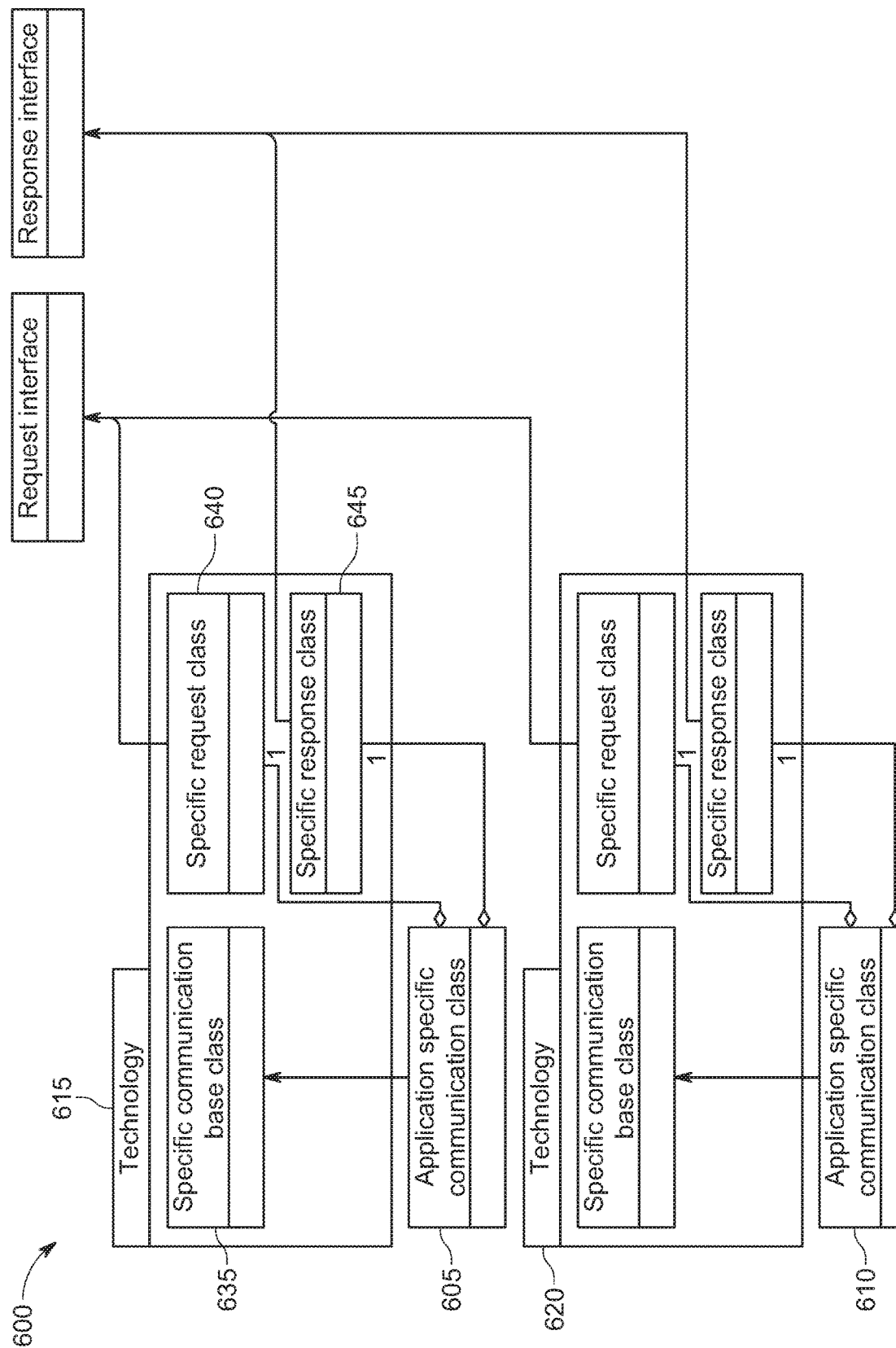
FIG. 6 includes an illustrative communication class diagram in accordance with an example embodiment.

FIG. 6 includes an illustrative communication class diagram 600, according to some embodiments herein. As illustrated two communication technologies 605 and 610 are represented by an application specific communication class 615 (e.g., HTTP) and 620 (e.g., REST), respectively, for each communication technology protocol. Each application specific communication class derives from a specific communication base class 635 defined for and corresponding to the respective communication type. Given the communication service call is divided into a request cycle and a response cycle, a specific request class (e.g., 640) and a specific response class (e.g., 645) are defined for each application specific communication class (e.g., 615).

Figure 7:
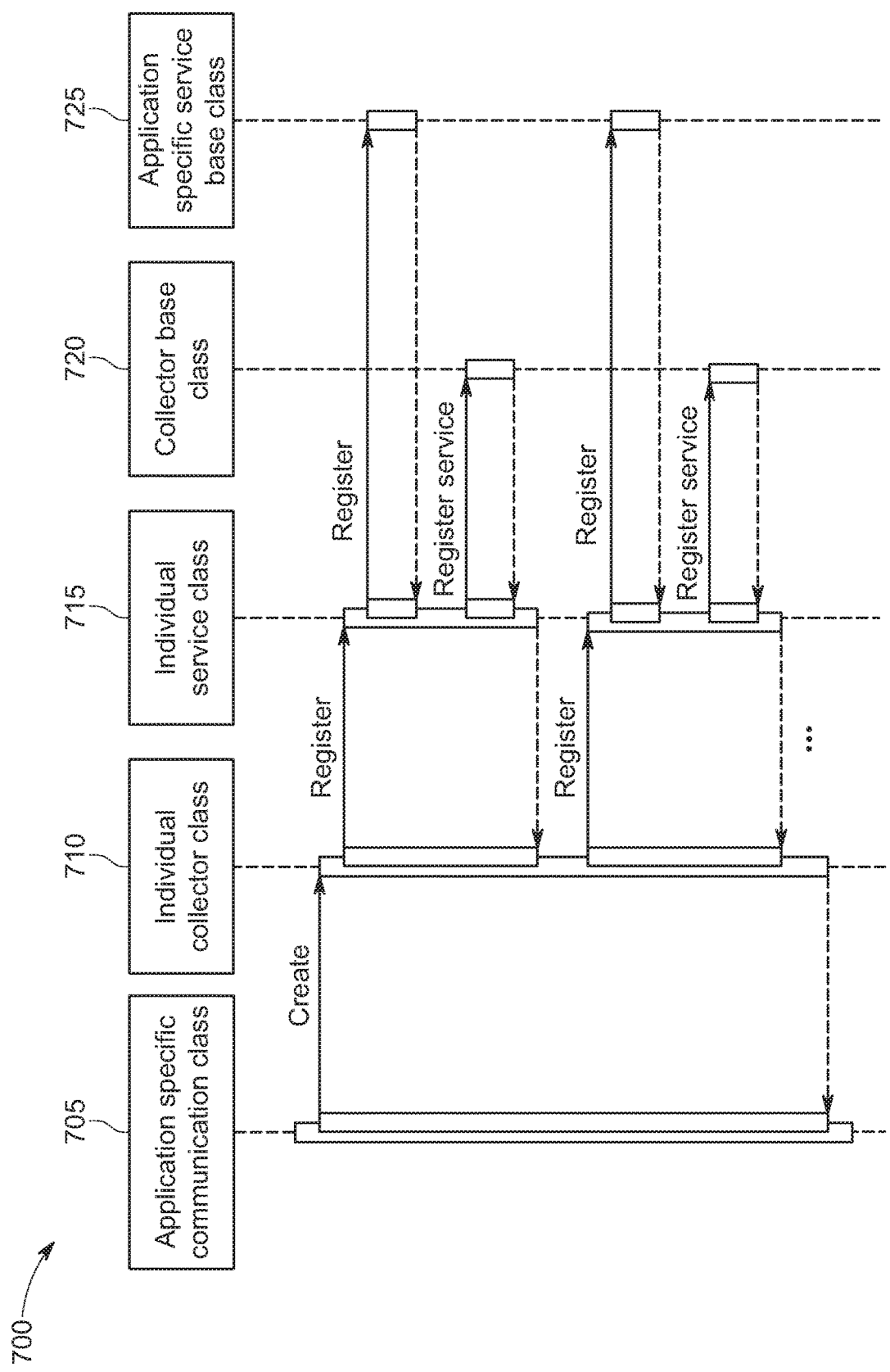
FIG. 7 is an illustrative sequence diagram for a communication framework instantiation in accordance with an example embodiment.

FIG. 7 is an illustrative sequence diagram 700 for a communication framework instantiation, in accordance with some embodiments herein. In some aspects, the communication framework instantiates an application specific communication class in response to a service call to the application specific communication class 705. For stateful communication, the framework may re-use an already instantiated object of an individual communication class. During an initial session, the application specific communication class instantiates its individual collector class 710, which instantiates all individual service classes 715 of the application when they are needed. The request is routed to the collector class that collects each service and registers the individual service class. A service call is thus implemented based on the registered services.

Depending on having a stateful communication, the instance of the application specific communication class may be re-used (e.g., if the service is called by the same client session) regardless of how stateful communication is determined.

In some aspects, the individual collector class 715 instantiates its individual service classes only one time. In the case they are already instantiated, these instances are used for subsequent calls of this client session. In an effort to support different kinds of parameter definition languages, an implementation in the application specific service base class 725 may be performed if the definition of that language is application specific or a separate utility class can be used for this.

In some embodiments, different instances of an application specific communication class 705 contain their own instances of individual collector classes 710 that contain their own instances of individual service classes 715. In this manner, different client instances might use the same backend instance without influencing each other.

Figure 8:
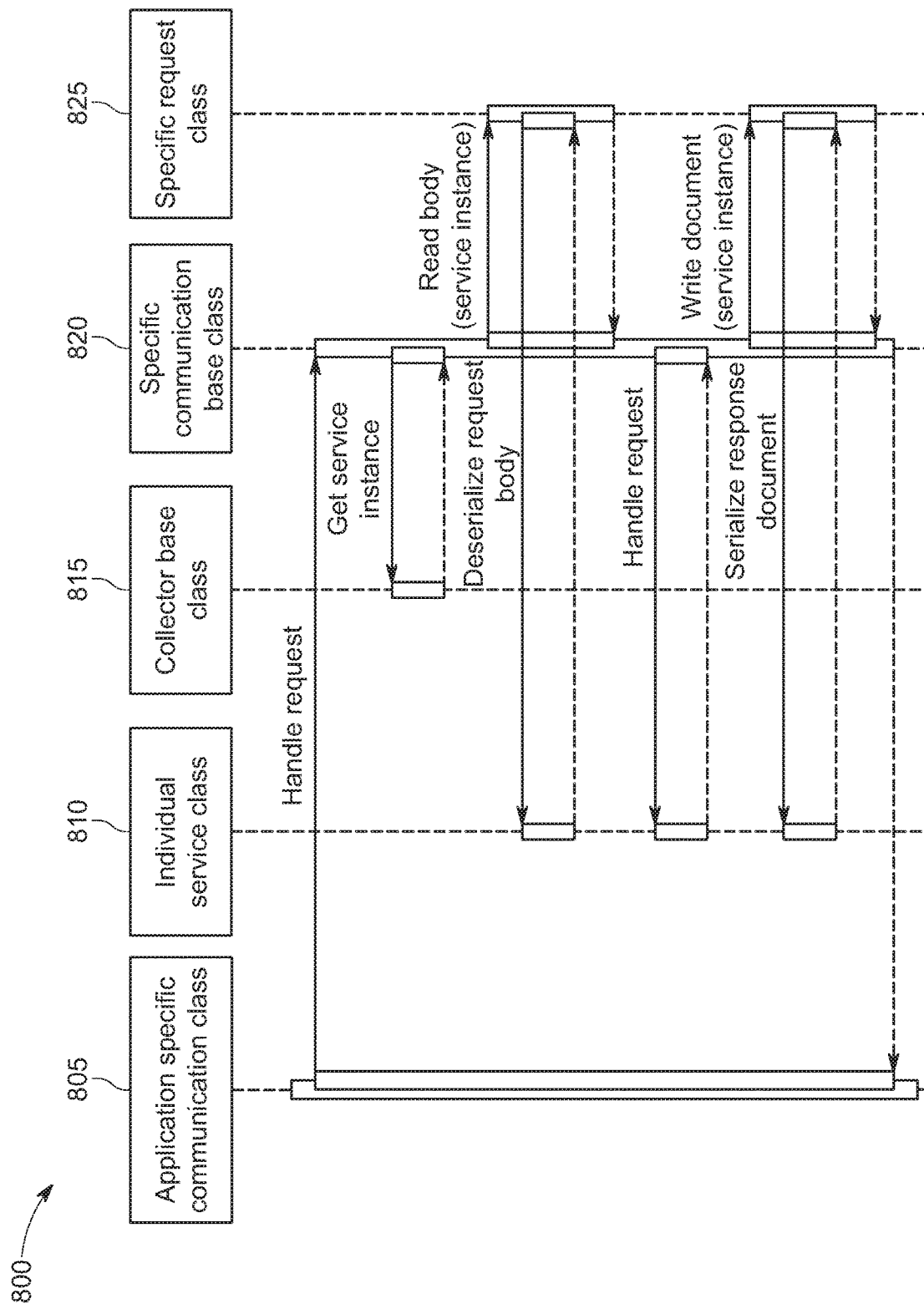
FIG. 8 includes an illustrative implementation of a request interface in accordance with an example embodiment.

An implementation of a request interface herein is illustratively depicted in FIG. 8 that includes a sequence diagram 800 for handle a request. As stated above, the interface encapsulates technology specific request interfaces to separate the communication technology to be used by an application from the application.

A request for a framework is routed to the specific communication base class 820 (e.g., HTTP base class). The request is analyzed and the corresponding service class is addressed (e.g., by a get service instance for a browser, etc.). Caching service classes may make sense for all kinds of stateful communication. The communication request is eventually routed to the addressed service class 810 to implement specific code for that operation.

A number of implementation artifacts may be used in implementing a request interface in FIG. 8. For example, in a HTTP context, a "Get Path" returns path information, if available (i.e., only the case in HTTP connections that use the path as part of the request). In other embodiments, a "Get Parameters" artifact returns parameters contained in the call, where the parameters may be contained in an URL path, in URL parameters, in the URL header, in the request body, parameters in RFC calls, etc. Notwithstanding how the parameters are determined, an internal parameter buffer contains all parameters independent of any technology providing parameters. In a HTTP context example, a "Get Method" artifact returns the method of a call. In other communication connections, other types of implementation artifacts may be used.

A "Get Body" artifact, in the instance the request contains a body, returns the body as a string. Some services might delegate directly the body instead of using deserialization. A "Read Body" implementation artifact may delegate conversion of body information into parameters. This may be needed, if an optional body of a document contains information that needs to be deserialized into parameters. This function calls the individual service class a deserialization.

A "Set Parameter" artifact stores all of the parameters that were extracted by the implementer of the individual service class, where the parameters are service specific and are defined in each individual service class. Another artifact may be a "Get Parameter" that is used by a service implementation to retrieve its parameters.

The implementation of a response interface encapsulates technology specific response interfaces and there may be a number of implementation artifacts associated therewith. Some examples include a "Set Response Code" that is an individual service class sets a response code that is transported to the calling client. A "Set Response Body" is filled by an individual service class and the framework transports it to the calling client. A "Write Document" artifact serializes parameters (e.g., HTTP based communication); a "Set Parameter" artifact stores all of the parameters that were returned in the request handling for later serialization; and a "Get Parameter" artifact is used in serialization to retrieve its parameters.

The application specific communication base classes illustrated in FIG. 6 are used to encapsulate a specific technology such as, for example, HTTP, RFC, etc. from the application. Implementation artifacts might not generally be available. For example, for HTTP based communication, these types of classes make sense but for RFC and similar connections to clients an RFC call might directly operate on a request/response and service implementation. However, some artifacts might be available including a "Handle Request" that delegates requests to the individual service classes, a "Parse URL" that parses a URL for determining parameters in the URL string and providing these parameters to the parameter buffer of the request implementation. An URL is as follows, wherein the relevant part is underlined: https://vendor.corp:44326/be/rest// <u>ltdhamb/dataset/%2FTABLES%2FBC%2FSRV%2FNWD/ children?$top=5&$skip=8</u> In some embodiments, artifacts may include "Parse URL Parameters" that are similar to parsing a URL string but are instead defined URL parameters. An example with the relevant part underlined is: https://vendor.corp:44326/bc/rest/ltdhamb/dataset/ %2FTABLES%2FBC%2FSRV%2FNWD/children?$ <u>top=5&$skip=8</u>.

For the request class and response class of the communication interfaces and classes of FIG. 6, a request and response class may be implemented specifically for each communication technology and implements only the methods given by the interfaces.

In some aspects, the application specific communication classes (FIG. 6, 615, 620) is part of a specific application implementation where this class derives from a specific communication base class (e.g., FIG. 6, 635) and contains additional, detailed information about the application. This particular class is the main class of a specific technology within an application.

In some embodiments, service caches may be used. For stateful communication scenarios, two caches may be implemented. One service cache may be implemented for the individual communication class containing per communication ID. In some instances, there might be different communications of different sessions re-using the same backend session for different frontend sessions. Another service cache may be for each individual service class per individual communication class. This cache may save runtime since, for example, a service class may only need to be instantiated once and service classes may contain instances that themselves need a large setup time.

Figure 9:
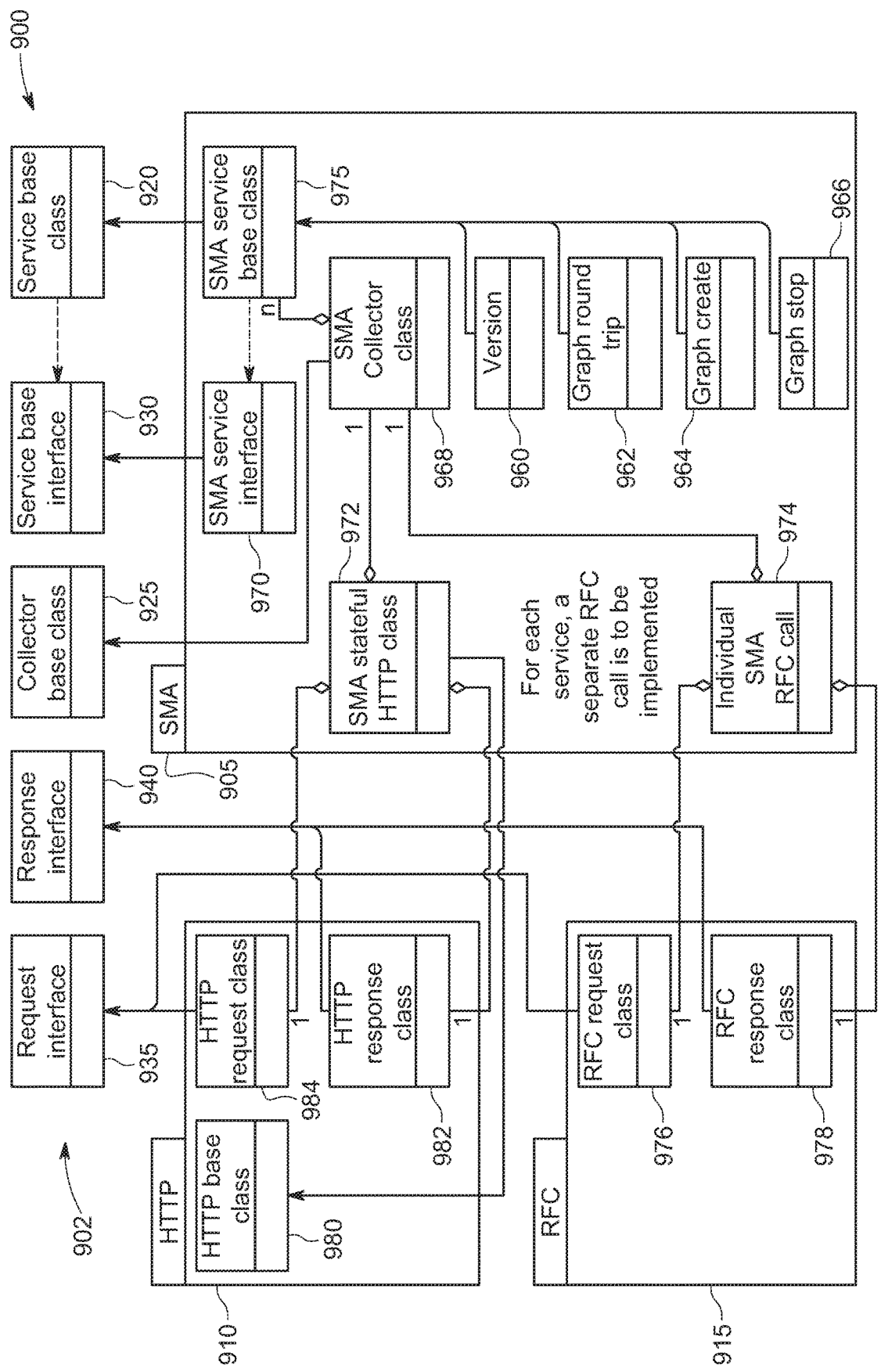
FIG. 9 is an illustrative depiction of the implementation of a framework in accordance with an example embodiment.

FIG. 9 is an illustrative depiction of the implementation of a framework 900 described hereinabove. Illustrated is a class diagram of an application 905 (e.g., an "System Management Application", SMA) including a stateful HTTP connection 972 and additionally an RFC connection 974. Application 905 is defined by a service base class 920 from which multiple services 960, 962, 964, and 966 derive definitions and specify additional details for each service. Collector class 968 collects all of the required services for the application and is referred to the stateful HTTP connection 972. The application service base class 975 derives from service base class 920, the application specific service interface 970 derives from service base interface 930, and the application specific collector 968 derives from collector base class 925, as described earlier. Also illustrated is an implementation of the communication interfaces 910 and 915 and corresponding classes for the application to communicate in two different communication technologies (e.g., HTTP at 910 and RFC at 915). Each communication interface may be represented or defined by a communication specific base class (e.g., 980). In the example of FIG. 9, no communication specific base class is defined for the RFC communication type, as it would be a trivial implementation (e.g., In this case the implementation for RFC uses a collector object because service objects are buffered in the collector and improves performance for a stateful communication. In some instances, a service may also be instantiated for each single RFC call). However, each communication specific interface is split into a request class (984, 976) and a response class (982, 978).

In some aspects, FIG. 9 illustrates a communication protocol or technology based implementation at 910 and 915 representative of HTTP and RFC communications; communication technology and application independent base classes and interfaces at 902; and the implementation of an application at 905. In some embodiments, aspects of the disclosed framework are represented by application specific framework communication classes that contain simple code since the main code is contained in the individual service classes like "Version", etc. under application specific base service base class 975.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
receiving a request from a calling client, the request including an indication of at least one specific communication protocol for communicating with the calling client and specifying one or more services for replying to the request;
determining an application to reply the request based on an analysis of the request, the application being represented by at least one service and at least one communication protocol specific interface associated with the at least one service, the application including a service collector that obtains the at least one service of the application and defines a set of services used in a remote interface of the application, the at least one service defining its communication parameters, and the at least one communication protocol specific interface being independent and distinct from the at least one service;
processing the request by the at least one service of the determined application to determine a response in reply to the request; and
sending, by the at least one communication protocol specific interface, the determined response to the calling client in the communication protocol indicated in the request.

2. The method of claim 1, wherein the communication protocol for communicating with the calling client is configured as at least one of Remote Function Call (RFC), Hypertext Transfer Protocol (HTTP), and Representational State Transfer (REST).

3. The method of claim 1, wherein each service represents a specific executable function.

4. The method of claim 1, wherein the determined application further comprises a collector that obtains the at least one service for inclusion in the determined application.

5. The method of claim 1, wherein the request includes a set of parameters that specify the one or more services for replying to the request.

6. The method of claim 5, wherein the configuration of the set of parameters depends on the indicated communication protocol for communicating with the calling client.

7. The method of claim 1, wherein the at least one communication protocol specific interface associated with the at least one service comprises a communication protocol specific interface for each specific communication protocol indicated in the request.

8. A system comprising:
a memory storing processor-executable program code; and
a processor to execute the processor-executable program code in order to cause the system to:
receive a request from a calling client, the request including an indication of a least one specific communication protocol for communicating with the calling client and specifying one or more services for replying to the request;
determine an application to reply the request based on an analysis of the request, the application being represented by at least one service and at least one communication protocol specific interface associated with the at least one service, the application including a service collector that obtains the at least one service of the application and defines a set of services used in a remote interface of the application, the at least one service defining its communication parameters, and the at least one communication protocol specific interface being independent and distinct from the at least one service;
process the request by the at least one service of the determined application to determine a response in reply to the request; and
send, by the at least one communication protocol specific interface, the determined response to the calling client in the communication protocol indicated in the request.

9. The system of claim 8, wherein the communication protocol for communicating with the calling client is configured as at least one of Remote Function Call (RFC), Hypertext Transfer Protocol (HTTP), and Representational State Transfer (REST).

10. The system of claim 8, wherein each service represents a specific executable function.

11. The system of claim 8, wherein the determined application further comprises a collector that obtains the at least one service for inclusion in the determined application.

12. The system of claim 8, wherein the request includes a set of parameters that specify the one or more services for replying to the request.

13. The system of claim 12, wherein the configuration of the set of parameters depends on the indicated communication protocol for communicating with the calling client.

14. The system of claim 8, wherein the at least one communication protocol specific interface associated with the at least one service comprises a communication protocol specific interface for each specific communication protocol indicated in the request.

15. A non-transitory, computer readable medium storing instructions, which when executed by at least one processor, cause a computer to perform a method comprising:
receiving a request from a calling client, the request including an indication of at least one specific communication protocol for communicating with the calling client and specifying one or more services for replying to the request;
determining an application to reply the request based on an analysis of the request, the application being represented by at least one service and at least one communication protocol specific interface associated with the at least one service, the application including a service collector that obtains the at least one service of the application and defines a set of services used in a remote interface of the application, the at least one service defining its communication parameters, and the at least one communication protocol specific interface being independent and distinct from the at least one service;
processing the request by the at least one service of the determined application to determine a response in reply to the request; and
sending, by the at least one communication protocol specific interface, the determined response to the calling client in the communication protocol indicated in the request.

16. The medium of claim 15, wherein the communication protocol for communicating with the calling client is configured as at least one of Remote Function Call (RFC), Hypertext Transfer Protocol (HTTP), and Representational State Transfer (REST).

17. The medium of claim 15, wherein each service represents a specific executable function.

18. The medium of claim 15, wherein the determined application further comprises a collector that obtains the at least one service for inclusion in the determined application.

19. The medium of claim 15, wherein the request includes a set of parameters that specify the one or more services for replying to the request.

20. The medium of claim 15, wherein the at least one communication protocol specific interface associated with the at least one service comprises a communication protocol specific interface for each specific communication protocol indicated in the request.

* * * * *